United States Patent [19]

Sugiura et al.

[11] Patent Number: 4,612,889
[45] Date of Patent: Sep. 23, 1986

[54] IDLE CONTROL METHOD FOR AN INTERNAL COMBUSTION ENGINE

[75] Inventors: Takayuki Sugiura; Takahisa Hasegawa, both of Hamamatsu, Japan

[73] Assignee: Suzuki Jidosha Kogyo Kabushiki Kaisha, Shizuoka, Japan

[21] Appl. No.: 804,012

[22] Filed: Dec. 3, 1985

[30] Foreign Application Priority Data

Dec. 28, 1984 [JP] Japan .................. 59-274939

[51] Int. Cl.$^4$ .................................. F02D 41/14
[52] U.S. Cl. .................... 123/339; 123/344; 123/489
[58] Field of Search ........... 123/339, 340, 344, 440, 123/489, 589

[56] References Cited

U.S. PATENT DOCUMENTS 4,425,886  1/1984  Kuroiwa et al. ............. 123/339
4,495,922  1/1985  Fujimura et al. ............ 123/440

FOREIGN PATENT DOCUMENTS 59-96453  6/1984  Japan .

Primary Examiner—Andrew M. Dolinar
Attorney, Agent, or Firm—Flynn, Thiel, Boutell & Tanis

[57] ABSTRACT

A method of controlling an air-fuel ratio of an air-fuel mixture for an internal combustion engine includes the steps of sensing the intake air temperature and the operating state and rotating speed of the engine using various detectors. When the intake air temperature is above a predetermined temperature, when the engine is in the idle operating state, and when its rotating speed is below a predetermined speed, the control circuit ceases a normal control in which the air-fuel ratio of the air-fuel mixture is controlled to be a value in a theoretical air-fuel ratio range, and instead controls the air-fuel ratio to be a predetermined rich air-fuel ratio. With this method, a decrease in the absolute amount of fuel supplied to the engine due to a reduction in intake air quantity in the idle operating state when the intake air temperature is high is avoided, which in turn prevents a reduction in the rotating speed of the engine and ensures stability of idling.

6 Claims, 2 Drawing Figures

IDLE CONTROL METHOD FOR AN INTERNAL COMBUSTION ENGINE

FIELD OF THE INVENTION

The present invention relates to an idle control method for an internal combustion engine and, more particularly, to an idle control method which can prevent a reduction in the rotating speed of the engine due to a decrease in the amount of intake air in the idle operating state when the temperature of the intake air is high, thereby enabling stability in idling to be achieved.

BACKGROUND OF THE INVENTION

In internal combustion engines, as a method of reducing harmful components in the exhaust gas, there is known a feedback control method wherein a concentration of oxygen in the exhaust gas is detected as an exhaust component value, or an amount of intake air and a rotating speed of the engine are also detected, and an air-fuel ratio of an air-fuel mixture produced by a carburetor or fuel injection apparatus is controlled to a value in a predetermined theoretical air-fuel ratio range on the basis of the detection signals. Using this method, the ternary catalyst which reduces the harmful exhaust components can be made to function effectively.

However, in the case of controlling the air-fuel ratio of the air-fuel mixture to a value in the theoretical air-fuel ratio range using such a feedback control method, if the temperature of the intake air increases due to an increase in the temperature of the outside air, the amount of intake air necessarily decreases and, due to the given air-fuel ratio, the absolute amount of fuel supplied to the engine is reduced. Thus, there is a drawback, in that the rotating speed of the engine is thereby decreased in the idle operating state, causing stability in idling to deteriorate.

To eliminate this drawback, hitherto there has been provided an actuator to open an intake throttle value arranged in the intake passage by a predetermined opening degree in the idle operating state in the case where the intake air temperature was high. Alternatively, there has been provided a bypass air passage to bypass the intake throttle valve and a solenoid valve to open the bypass air passage in the idle operating state in the case where the intake air temperature was high. Due to this, the intake air quantity is increased in the idle operating state when the intake air temperature is high, thereby avoiding the reduction in the absolute amount of fuel due to a decrease in the amount of intake air. In this way, a decrease in the rotating speed of the engine is prevented and idling stability is secured. However, as mentioned above, this method needs a control component such as the actuator, solenoid valve or the like to increase the amount of intake air, causing the structure to be complicated and resulting in an increase in cost.

SUMMARY OF THE INVENTION

In is an object of the present invention to provide an idle control method for an internal combustion engine which avoids or compensates for a decrease in the absolute amount of fuel supplied to the engine due to a reduction in the intake air quantity where the intake air temperature is high in the idle operating state, thereby preventing a reduction in the rotating speed of the engine and enabling stability in idling to be achieved without increasing the cost of the engine.

This object is accomplished according to the invention by a method of controlling air air-fuel ratio of an air-fuel mixture for an internal combustion engine which includes the steps of: detecting the intake air temperature, the operating state of the engine, and the rotating speed of the engine using a detecting arrangement; inputting detection signals from the detecting arrangement to a control circuit; causing the control circuit to normally control the air-fuel ratio of the air-fuel mixture to a value in a theoretical air fuel ratio range; and causing the control circuit to cease such normal control when the intake air temperature is above a predetermined temperature, the operating state of the engine is in the idle operating state and the rotating speed of the engine is below a predetermined speed, and instead to control the air-fuel ratio of the air-fuel mixture to be a predetermined rich air-fuel ratio.

According to the invention, when (1) the intake air temperature is above a predetermined temperature, (2) the engine is in the idle operating state, and (3) the rotating speed of the engine is below a predetermined speed, the control circuit sets the air-fuel ratio of the air-fuel mixture to a predetermined rich ratio instead of controlling the air-fuel ratio of the air-fuel mixture to be a value in a theoretical air-fuel ratio range. Thus, the invention avoids the decrease in the absolute amount of fuel supplied to the engine which would otherwise occur due to the reduction in the amount of intake air when the intake air temperature is high in the idle operating state, thereby preventing a reduction in the rotating speed of the engine and thus stabilizing the idling of the engine.

BRIEF DESCRIPTION OF THE DRAWINGS

One embodiment of the present invention will be described in detail hereinbelow with reference to the drawings, in which.

DETAILED DESCRIPTION

Figure 1:
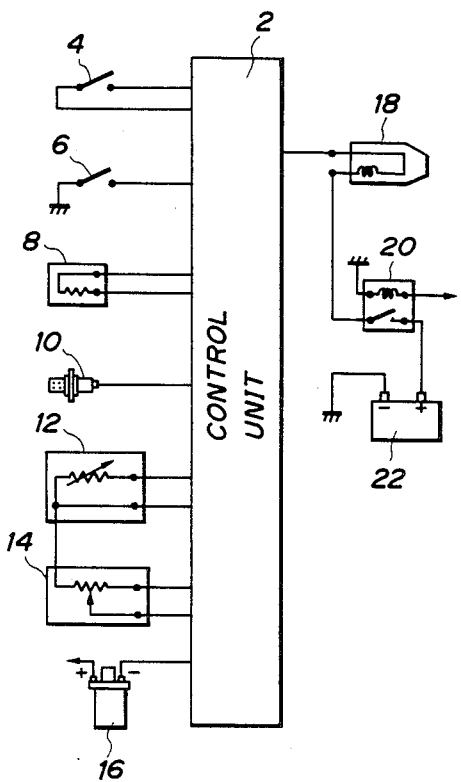
FIG. 1 is a schematic circuit diagram of a fuel injection apparatus which can be used to carry out the method according to the present invention.

In FIG. 1, a control circuit 2 is provided, and various kinds of detecting devices are connected to input terminals of the control circuit 2. Practically speaking, these include an idle switch 4 to detect the idle operating state of the engine, a clutch switch 6 to detect engagement or disengagement of a clutch (not shown), a coolant temperature sensor 8 to detect the temperature of cooling water or a coolant, an $O_2$ sensor 10 to detect the concentration of oxygen in the exhaust gas, an intake air temperature sensor 12 to detect the temperature of air in the intake passage, an air flow meter 14 to detect the quantity of intake air flowing into the engine, and an ignition coil 16 which indicates the rotating speed of the engine. A fuel injection valve 18 is connected to an output terminal of the control circuit 2. In response to signals from the detecting devices, the control circuit 2 makes the fuel injection valve 18 operative, thereby controlling the air-fuel ratio of the air-fuel mixture for the internal combustion engine. A relay 20 for injection is also provided. The coil side of this relay is connected to an ignition switch (not shown), while the contact side is connected to the injection valve 18 and to a battery 22 serving as a power supply.

The control unit 2 is preferably a conventional microprocessor-based fuel injection control circuit, and is therefore not described in detail. The inventive method is implemented by revising the conventional program for the microprocessor, the requisite program modifications being described in detail below in association with the flowchart of FIG. 2.

The control circuit 2 receives detection signals from the detecting devices, namely detection signals indicating the concentration of oxygen in the exhaust gas, the intake air quantity and the rotating speed of the engine, which are respectively produced by the $O_2$ sensor 10, air flow meter 14 and ignition coil 16. The control circuit 2 controls the valve 18 on the basis of these detection signals, in particular by feedback-controlling the air-fuel ratio of the air-fuel mixture to a value in the theoretical air-fuel ratio range. Due to this, a ternary catalyst (not shown) for reducing the harmful exhaust gas components is allowed to function effectively, so that the harmful exhaust components can be effectively reduced.

The conventional feedback control mentioned in the preceding paragraph typically is carried out by slowly increasing the air-fuel ratio until one or more parameters being monitored change, and then slowly decreasing the air-fuel ratio until one or more of the parameters change again. For example, the air-fuel ratio can be slowly leaned until the concentration of oxygen in the exhaust gases is below a predetermined value, can then be slowly made richer until the concentration of oxygen again exceeds the predetermined value, and so forth, limited only by the bounds of the predetermined theoretical air-fuel ratio range.

The present invention is intended to assure idling stability by preventing a reduction in the rotating speed of the engine in the idle operating state when the intake air temperature is high. Therefore, the control circuit 2 causes the valve 18 to control the air-fuel ratio to a predetermined rich air-fuel ratio in response to the detection signals from the intake air temperature sensor 12, idle switch 4 and ignition coil 16, as explained below with reference to the flowchart shown in FIG. 2.

Figure 2:
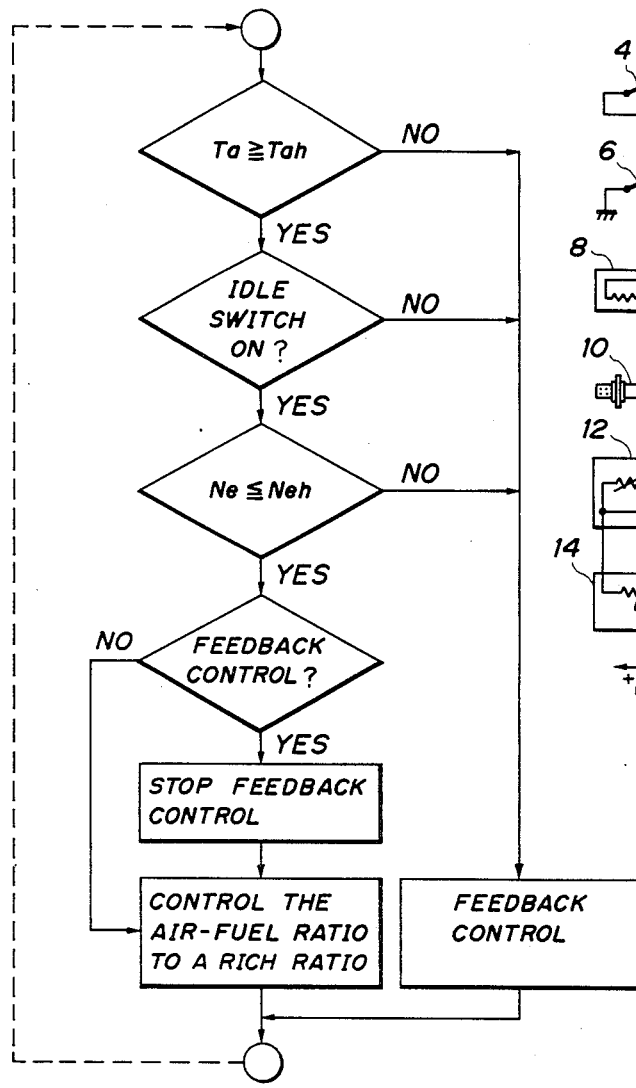
FIG. 2 is a flowchart showing a preferred embodiment of the method according to the invention.

As shown in FIG. 2, when several specified conditions are satisfied, namely when the intake air temperature $T_a$ is above a predetermined temperature $T_{ah}$, the idle switch 4 is ON to indicate the engine is in the idle operating state, and the rotating speed $N_e$ of the engine is below a predetermined rotating speed $N_{eh}$, normal feedback control is stopped. Then, the control circuit 2 sets the air-fuel ratio to a predetermined rich air-fuel ratio, for example a ratio of about 13:1, at which smooth engine rotation is obtained. When feedback control is not being performed, the air-fuel ratio is immediately set to the foregoing rich preset air-fuel ratio. Thus, compensation is made for the reduction which would otherwise occur in the absolute amount of fuel injected due to the decrease in the amount of intake air in the idle operating state when the intake air temperature is high, and a reduction in the rotating speed of the engine is prevented so that idling stability is achieved. In addition, there is no need to provide additional structure such as an actuator or the like, and an increase in cost is avoided.

In FIG. 2, if any one of the conditions with respect to intake air temperature $T_a$, idle state and rotating speed $N_e$ of the engine is not satisfied, the air-fuel ratio is not set to the preset rich air-fuel ratio, but instead is feedback-controlled in the normal manner to an air-fuel ratio in the theoretical air-fuel ratio range.

Although the inventive method has been described in the context of a fuel injection apparatus, the invention also can obviously be applied to an electronically controlled carburetor. Also, although the temperature of the air in the intake passage is detected as an intake air temperature, it is alternatively possible to detect the temperature of air in the engine compartment and to compare it to a predetermined temperature.

According to the present invention, and as described above, when the intake air temperature is above a predetermined temperature, when the internal combustion engine is in the idle operating state, and when the rotating speed of the engine is below a predetermined rotating speed, the air-fuel ratio is controlled to be a predetermined rich air-fuel ratio, thereby avoiding the reduction in the absolute amount of fuel supplied to the engine which would otherwise result due to the decrease in the intake air quantity in the idle operating state where the intake air temperature is high. Thus, a reduction in the rotating speed of the engine is prevented and idling stability is achieved. Also, there is no need to provide additional structure such as an actuator or the like as in conventional methods, so that the method of the invention can be realized at a low cost.

The present invention is not limited to the foregoing embodiment, since many modifications and variations, including the rearrangement of parts, are possible within the spirit and scope of the appended claims.

What is claimed is:

1. A method of controlling an air-fuel ratio of an air-fuel mixture for an internal combustion engine which has detecting means to detect the value of at least one exhaust component, comprising the steps of:

detecting an intake air temperature, an operating state and a rotating speed of the engine using said detecting means;

inputting detection signals generated by said detecting means to a control circuit;

causing said control circuit to normally control the air-fuel ratio of the air-fuel mixture for the engine so that it is a value in a theoretical air-fuel ratio range; and causing said control circuit to stop said normal control when the intake air temperature is above a predetermined temperature, the operating state of the engine is in the idle operating state, and the rotating speed of the engine is below a predetermined rotating speed, and to instead control the air-fuel ratio of the air-fuel mixture to be a rich, predetermined air-fuel ratio during such conditions.

2. A method according to claim 1, wherein said step of causing said control circuit to control the air-fuel ratio to said value in said range includes the step of controlling a fuel injection valve with said control circuit so as to feedback-control the air-fuel ratio of the air-fuel mixture to said value in said theoretical air-fuel ratio range.

3. A method according to claim 1, wherein said intake air temperature is detected by an intake air temperature sensor, said idle operating state of the engine is detected by an idle switch, and said rotating speed of the engine is detected from an ignition coil of the engine.

4. A method according to claim 1, further comprising the step of using said detecting means for detecting further parameters, including engagement and disengagement of a clutch, a coolant temperature, a concentration of oxygen in the exhaust gas, and the quantity of intake air, and causing said control circuit to also utilize said further parameters in controlling the air-fuel ratio of the air-fuel mixture to said value in said theoretical air-fuel ratio range.

5. A method according to claim 4, wherein said engagement and disengagement of the clutch is detected by a clutch switch, wherein said coolant temperature is detected by a coolant temperature sensor, wherein said concentration of oxygen in the exhaust gases is detected by an $O_2$ sensor, and wherein said intake air quantity is detected by an air flow meter.

6. A method according to claim 1, wherein said predetermined air-fuel ratio for the air-fuel mixture is about 13:1.

* * * * *